US012798558B2

(12) United States Patent
Katsuyama et al.

(10) Patent No.: US 12,798,558 B2
(45) Date of Patent: Nov. 17, 2026

(54) CONTROL DEVICE, CONTROL METHOD, AND STORAGE MEDIUM

(71) Applicant: HONDA MOTOR CO., LTD., Tokyo (JP)

(72) Inventors: Yoshihiro Katsuyama, Tokyo (JP); Hironori Hirata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/064,708

(22) Filed: Feb. 27, 2025

(65) Prior Publication Data

US 2025/0304038 A1 Oct. 2, 2025

(30) Foreign Application Priority Data

Mar. 27, 2024 (JP) ................................ 2024-051001

(51) Int. Cl.

*B60W 30/06* (2006.01)
*B60W 50/14* (2020.01)
*B60W 60/00* (2020.01)

(52) U.S. Cl.

CPC ............ *B60W 30/06* (2013.01); *B60W 50/14* (2013.01); *B60W 60/001* (2020.02); *B60W 2050/146* (2013.01)

(58) Field of Classification Search

CPC .... B60W 30/06; B62D 12/0285; G08G 1/146
See application file for complete search history.

(56) References Cited

U.S. PATENT DOCUMENTS

| | | | |
|---|---|---|---|
| 2014/0176349 A1 | 6/2014 | Smullin et al. | |
| 2015/0287322 A1 | 10/2015 | Smullin et al. | |
| 2018/0208245 A1 | 7/2018 | Mizutani et al. | |
| 2021/0078496 A1 | 3/2021 | Yamamoto et al. | |
| 2021/0300337 A1 | 9/2021 | Fujitani et al. | |
| 2024/0068829 A1* | 2/2024 | Kowald | H04W 4/029 |
| 2025/0171014 A1* | 5/2025 | Okabe | B60W 50/14 |
| 2025/0229769 A1* | 7/2025 | Shakutsui | B62D 15/0285 |
| 2026/0061995 A1* | 3/2026 | Hattori | B60W 30/06 |

FOREIGN PATENT DOCUMENTS

| | | |
|---|---|---|
| CN | 115503694 B | 6/2023 |
| JP | 2014-123356 A | 7/2014 |
| JP | 2014-137804 A | 7/2014 |
| JP | 2018-118550 A | 8/2018 |
| JP | 2021-043815 A | 3/2021 |
| JP | 2021-151815 A | 9/2021 |
| JP | 2023-179260 A | 12/2023 |

OTHER PUBLICATIONS

Dec. 2, 2025, Translation of Japanese Office Action issued for related JP Application No. 2024-051001.

* cited by examiner

*Primary Examiner* — Anshul Sood

(74) *Attorney, Agent, or Firm* — Paratus Law Group, PLLC

(57) ABSTRACT

A control device for controlling a vehicle to be parked at a predetermined parking position, the control device includes: an acquisition unit configured to acquire route information capable of identifying a route to each of parking positions; a processing unit configured to group two or more parking positions with routes at least partially overlapping each other based on the route information; and a control unit configured to cause the vehicle to move toward the grouped two or more parking positions.

16 Claims, 7 Drawing Sheets

(FIG. 1 CONTINUED)
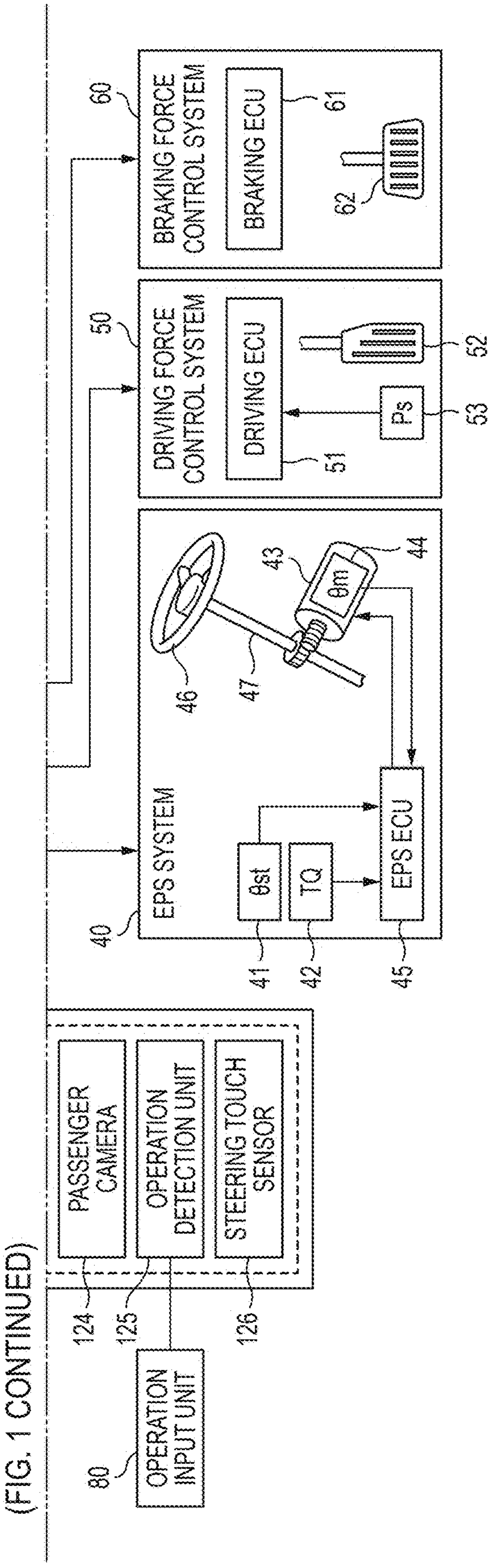

PARKING HISTORY INFORMATION

35b

| PARKING POSITION | ROUTE | NUMBER OF PARKING TIMES | MOST RECENT USE | PRIORITY |
|---|---|---|---|---|
| P1 | N1→N2→N3... | 10 TIMES | YES | 1 |
| P2 | – | – | – | – |
| P3 | N1→N2→N4... | 8 TIMES | YES | 2 |
| P4 | N5→N6 | 3 TIMES | YES | 4 |
| P5 | N7→N2→N8... | 5 TIMES | NO | 3 |

CONTROL DEVICE, CONTROL METHOD, AND STORAGE MEDIUM

This application is based upon and claims the benefit of priority from prior Japanese patent application No. 2024-51001, filed on Mar. 27, 2024, the entire contents of which are incorporated herein by reference.

TECHNICAL FIELD

The present disclosure relates to a control device, a control method, and a storage medium storing a control program.

BACKGROUND ART

In recent years, active efforts have been made to provide access to a sustainable transportation system in consideration of vulnerable traffic participants. As one of these efforts, research and development on driving assistance techniques and autonomous driving techniques for vehicles such as automobiles have been made in order to further improve safety and convenience of traffic.

For example, a driving assistance technology has been disclosed in the related art in which adjacent parking positions are grouped and a vehicle is automatically parked in any one of the grouped parking positions (for example, CN115503694A).

SUMMARY OF INVENTION

However, if the adjacent parking positions are grouped uniformly, a parking position that is unnecessary for a user may be grouped in the same group. For example, the parking positions that are not used by the user may be grouped in the same group as parking positions that are used by the user. Therefore, it is desirable to group the parking positions according to a usage of the user.

Aspects of the present disclosure relate to providing a control device, a control method, and a storage medium storing a control program that are capable of grouping a parking position according to a usage of a user.

According to an aspect of the present disclosure, there is provided a control device for controlling a vehicle to be parked at a predetermined parking position, the control device including: an acquisition unit configured to acquire route information capable of identifying a route to each of parking positions; a processing unit configured to group two or more parking positions with routes at least partially overlapping each other based on the route information; and a control unit configured to cause the vehicle to move toward the grouped two or more parking positions.

According to another aspect of the present disclosure, there is provided a control method using a computer for controlling a vehicle to be parked at a predetermined parking position, the control method including:

acquiring route information capable of identifying a route to each of parking positions;

grouping two or more parking positions with routes at least partially overlapping each other based on the route information; and causing the vehicle to move toward the grouped two or more parking positions.

According to another aspect of the present disclosure, there is provided a non-transitory computer-readable storage medium storing a control program causing a computer for controlling a vehicle to be parked at a predetermined parking position to execute a process, the process including:

acquiring route information capable of identifying a route to each of parking positions;

grouping two or more parking positions with routes at least partially overlapping each other based on the route information; and causing the vehicle to move toward the grouped two or more parking positions.

According to aspects of the present disclosure, it is possible to group a parking position according to a usage of a user. This further improves safety of traffic and contributes to development of a sustainable transportation system.

BRIEF DESCRIPTION OF DRAWINGS

Exemplary embodiment(s) of the present invention will be described in detail based on the following figures, wherein.

DESCRIPTION OF EMBODIMENTS

Hereinafter, an embodiment of a vehicle control device according to the present disclosure will be described with reference to the drawings. The following embodiment does not limit the present disclosure, and not all of elements described in the following embodiment are necessary to the present disclosure. In addition, two or more elements described in the following embodiment may be freely combined without departing the gist of the present disclosure. Hereinafter, the same or similar elements are denoted by the same or similar reference signs, and a description thereof may be omitted or simplified.

<Vehicle Equipped with Control Device>

Figure 1:
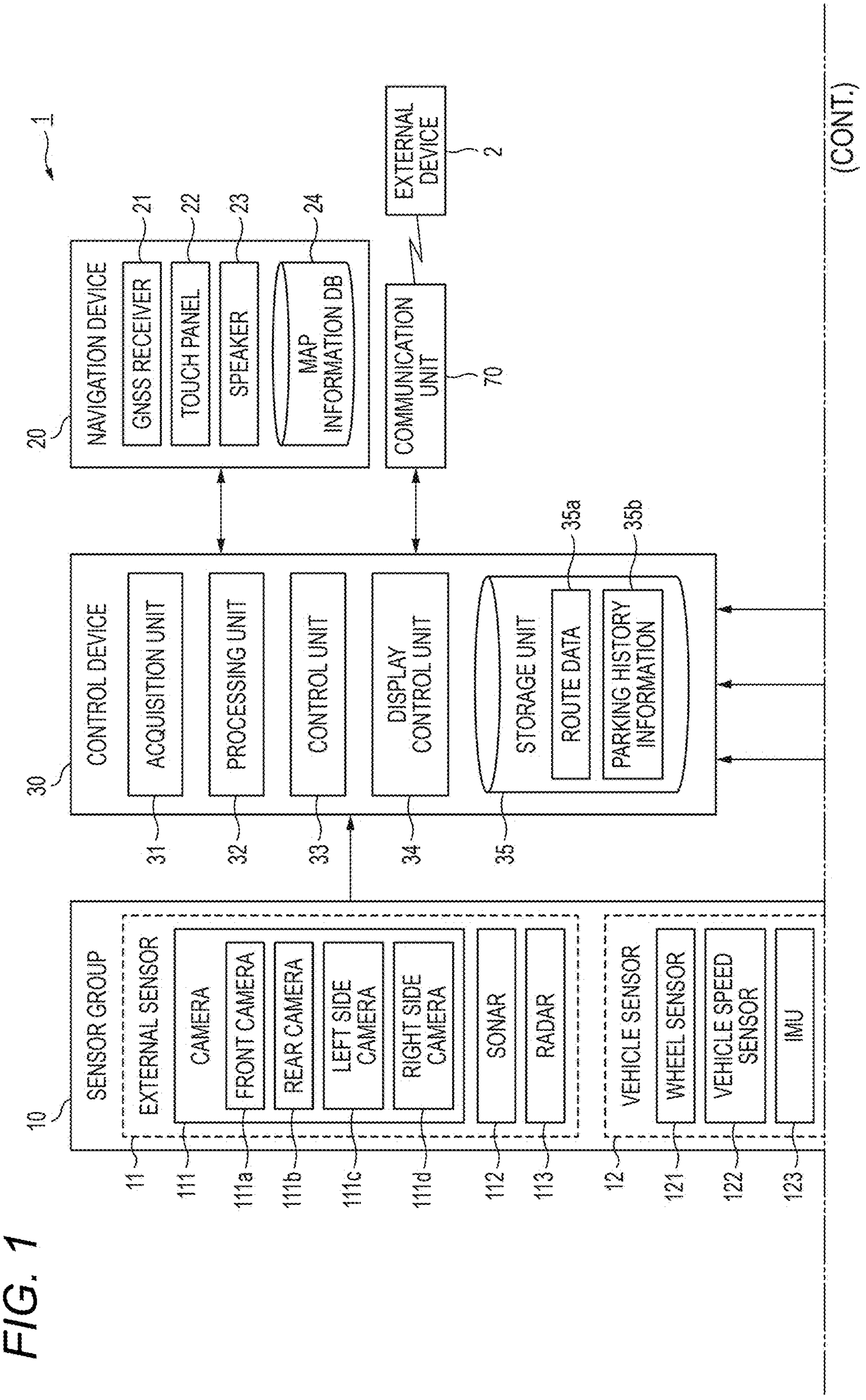
FIG. 1 is a block diagram showing a schematic configuration of a vehicle 1 equipped with a control device 30 of an embodiment.

First, a vehicle of the present embodiment will be described. FIG. 1 is a block diagram showing a configuration of a vehicle 1 equipped with a control device 30 of the embodiment. The vehicle 1 is an automobile including a drive source (not shown) and wheels including drive wheels driven by power of the drive source and steerable steered wheels. As an example, the vehicle 1 can be a four-wheeled automobile having a pair of left and right front wheels and a pair of left and right rear wheels.

The drive source of the vehicle 1 may be an electric motor, may be an internal combustion engine such as a gasoline engine or a diesel engine, or may be a combination of an electric motor and an internal combustion engine. The drive source of the vehicle 1 may drive the pair of left and right front wheels, may drive the pair of left and right rear wheels, or may drive four wheels including the pair of left and right front wheels and the pair of left and right rear wheels. Either the front wheels or the rear wheels of the vehicle 1 may be steerable steered wheels, or the front wheels and the rear wheels may all be steerable steered wheels.

The vehicle 1 is capable of driving assistance and autonomous driving autonomously controlling a driving operation to travel. The autonomous driving defined here means that a system of a vehicle performs all driving operations such as recognition or monitoring of a travel environment and peripheral situations, as well as starting, accelerating/decelerating, steering, and stopping. The driving assistance means that a system of a vehicle performs some of driving operations such as starting, accelerating/decelerating, steering, and stopping, and is, for example, an automatic parking system (APS), a lane keep assist system (LKAS), and adaptive cruise control (ACC). In the embodiment described below, the vehicle 1 is moved to, for example, a predetermined parking position as a target position until the vehicle 1 reaches the parking position. As is well-known in the related art, a plurality of levels of a driving control in the autonomous driving and the driving assistance may be present, and may be defined, for example, as levels 0 to 5 established by the Society of Automotive Engineers (SAE) of the United States. Regarding the level of the driving control, the larger the level number, the lighter an operational burden of a driver (in other words, the larger the level number, the higher the degree of automation). Specific contents of level 0 to level 5 are well-known, and thus descriptions thereof are omitted here.

The vehicle 1 includes a sensor group 10, a navigation device 20, the control device 30, an electric power steering (EPS) system 40, a driving force control system 50, a braking force control system 60, a communication unit 70, and an operation input unit 80.

The sensor group 10 includes an external sensor 11 that acquires information about the periphery of the vehicle 1, and a vehicle sensor 12 that acquires information about the vehicle 1. Information (in other words, detection values) acquired by each sensor included in the sensor group 10 is output to the control device 30.

The external sensor 11 includes, for example, a camera 111, a sonar 112, and a radar 113. The camera 111 is a digital camera that images the periphery, including the vehicle 1, of the vehicle 1, and outputs image data of the obtained peripheral image to the control device 30. In the present embodiment, since the vehicle 1 is capable of autonomous driving and automatic parking, the vehicle 1 has a front camera 111*a*, a rear camera 111*b*, a left side camera 111*c*, and a right side camera 111*d* in order to acquire peripheral images in all directions of the vehicle 1. The camera 111 does not need to have all of these cameras 111*a* to 111*d*, but it is sufficient to have at least enough cameras to enable the autonomous driving, the automatic parking, or the like.

The front camera 111*a* is provided, for example, at an upper portion of a front window in a passenger compartment or a front bumper, and images a front region of the vehicle 1. The rear camera 111*b* is provided, for example, at a rear bumper or the like, and images a rear region of the vehicle 1. The left side camera 111*c* is provided, for example, at a left side mirror, and images a left side region of the vehicle 1. The right side camera 111*d* is provided, for example, at a right side mirror, and images a right side region of the vehicle 1. Each of the cameras 111*a* to 111*d* may be a digital camera using an imaging element such as a charge coupled device (CCD) or a complementary metal oxide semiconductor (CMOS). In the following description, the front camera 111*a*, the rear camera 111*b*, the left side camera 111*c*, and the right side camera 111*d* will be simply referred to as a "camera 111" unless these cameras are particularly distinguished from one another.

The sonar 112 emits sound waves to the periphery of the vehicle 1 (for example, front, rear, and sides of the vehicle 1), and receives reflected sound from an object present in the periphery of the vehicle 1 to detect a distance to, an orientation of, or the like of the object. The detected information is transmitted to the control device 30 at a predetermined cycle. The radar 113 emits radio waves to the periphery of the vehicle 1 which includes the front of the vehicle 1, and receives the reflected waves from an object present in the periphery of the vehicle 1 to detect a distance to, an orientation of, or the like of the object. The detected information is transmitted to the control device 30 at a predetermined cycle. For example, a millimeter wave radar can be used as the radar 113.

The external sensor 11 may include a light detection and ranging (LiDAR) instead of or in addition to the sonar 112 and the radar 113. In this case, the LiDAR emits a laser light to the periphery of the vehicle 1 which includes the front of the vehicle 1, and receives the reflected light from an object present in the periphery of the vehicle 1 to detect a distance to, an orientation of, or the like of the object.

The vehicle sensor 12 includes, for example, a wheel sensor 121, a vehicle speed sensor 122, an inertial measurement unit (IMU) 123, a passenger camera 124, an operation detection unit 125, and a steering touch sensor 126.

The wheel sensor 121 detects a rotation angle of one or more wheels of the wheels included in the vehicle 1. As an example, the wheel sensor 121 detects a rotation angle of each of the left rear wheel and the right rear wheel. For example, an angle sensor or a displacement sensor can be used as the wheel sensor 121.

The vehicle speed sensor 122 detects a vehicle speed, which is a travel speed of the vehicle 1 (in other words, a movement speed of a vehicle body). For example, the vehicle speed sensor 122 detects the vehicle speed based on the number of revolutions of a countershaft (not shown) included in the vehicle 1.

The inertial measurement unit 123 detects angular velocities in a pitch direction, a roll direction, and a yaw direction of the vehicle 1, and accelerations in a front-rear direction, a left-right direction, and an upper-lower direction of the vehicle 1. The vehicle sensor 12 may include, instead of the inertial measurement unit 123, an acceleration sensor that detects an acceleration in a predetermined direction of the vehicle 1 and a gyro sensor that detects an angular velocity in a predetermined direction of the vehicle 1.

The passenger camera 124 is a digital camera that images an interior of the vehicle 1 and outputs image data of the obtained interior image to the control device 30. For example, the passenger camera 124 can be a "driver monitor camera" that is provided to be capable of imaging the head of the driver sitting in a driver seat of the vehicle 1 from the front (in other words, to image the face). A digital camera using an imaging element such as a CCD or CMOS can be used as the passenger camera 124, similar to the camera 111. In the present embodiment, the image data of the interior image obtained by the passenger camera 124 imaging the interior of the vehicle is information that can identify an orientation of a line of sight of the driver.

The operation detection unit 125 detects an operation performed using the operation input unit 80 that is provided to be capable of being operated by passengers including the driver. In the present embodiment, the operation input unit 80 includes, for example, an operation switch (not shown) that accepts an operation to switch the autonomous driving or automatic parking on (in other words, to be activated) and off (in other words, to be deactivated). In this case, the operation detection unit 125 can detect the operation to turn the autonomous driving or automatic parking on or off.

The steering touch sensor 126 detects whether a steering wheel 46 of the vehicle 1 is being held properly. For example, the steering touch sensor 126 is implemented by a capacitance sensor or the like. In this case, the capacitance sensor is provided at a portion where the driver touches the steering wheel 46 when the steering wheel 46 is being held properly.

The navigation device 20 includes, for example, a global navigation satellite system (GNSS) receiver 21, a touch panel 22, and a speaker 23. The navigation device 20 also has a storage unit (not shown) that is implemented by a flash memory or the like. The storage unit of the navigation device 20 stores a map information database (DB) 24 and the like.

The GNSS receiver 21 identifies a current position of the vehicle 1 (for example, a latitude and a longitude of a position where the vehicle 1 is located) based on a signal received from a GNSS satellite. The navigation device 20 may acquire, for example, a detection result of the vehicle sensor 12 (for example, the wheel sensor 121 or the vehicle speed sensor 122) via the control device 30, and identify or complement the current position of the vehicle 1 by an inertial navigation system (INS) using the detection value of the vehicle sensor 12.

The touch panel 22 functions as an input device that receives input of various types of information to the control device 30 and as a display device controlled by the control device 30. The touch panel 22 is implemented by combining a display device such as a liquid crystal display or an organic light emitting diode (OLED) with a pointing device (for example, touch pad). The speaker 23 is configured to output sound to a passenger (for example, driver) of the vehicle 1. The touch panel 22 is an example of a "predetermined display unit" in the present disclosure.

For example, by referring to the map information database 24, the navigation device 20 searches for a route (hereinafter called as "guidance route") from the current position of the vehicle 1 to a destination set by the driver using the touch panel 22. Then, the navigation device 20 performs route guidance using the touch panel 22 and the speaker 23 based on the searched guidance route. The navigation device 20 may also cause the touch panel 22 to perform a predetermined display according to an instruction from the control device 30. A specific display will be described later. Furthermore, the navigation device 20 may output, to the control device 30, predetermined information such as information indicating the identified current position of the vehicle 1 or information indicating an operation accepted via the touch panel 22.

The control device 30 is, for example, a computer that includes a processor for performing various calculations, a storage unit 35 having a non-transitory storage medium for storing various kinds of information, an input and output unit for controlling input and output of data between the inside and outside of the control device 30, and the like (not shown), and controls the entire vehicle 1.

The control device 30 is implemented by one electronic control unit (ECU) or by a plurality of ECUs working together. The control device 30 performs the driving assistance such as controlling the vehicle on behalf of the driver, and can therefore be called a control device in an advanced driving assistance system (ADAS ECU). A specific configuration and a specific example of control of the control device 30 including the storage unit 35 will be described later, and thus descriptions thereof are omitted here.

The EPS system 40 includes, for example, a steering angle sensor 41, a torque sensor 42, an EPS motor 43, a resolver 44, and an EPS ECU 45.

The steering angle sensor 41 detects a steering angle θst of the steering wheel 46, and outputs information indicating the detected steering angle θst to the EPS ECU 45. The torque sensor 42 detects steering torque TQ, which is torque applied to the steering wheel 46 of the vehicle 1, and outputs information indicating the detected steering torque TQ to the EPS ECU 45.

The EPS motor 43 assists the driver in operating the steering wheel 46 by applying, according to an instruction from the EPS ECU 45, a driving force or a reaction force to a steering column 47 connected to the steering wheel 46. The resolver 44 detects a rotation angle θm of the EPS motor 43, and outputs information indicating the detected rotation angle θm to the EPS ECU 45.

The EPS ECU 45 is, for example, a computer that includes a processor for performing various calculations, a storage unit including a non-transitory storage medium for storing various kinds of information, an input and output unit for controlling input and output of data between the inside and outside of the EPS ECU 45, and the like (all not shown), and controls the EPS system 40 (for example, EPS motor 43), and is implemented by one or more ECUs. For example, the EPS ECU 45 controls the EPS system 40 (for example, EPS motor 43) based on the steering angle θst detected by the steering angle sensor 41, the steering torque TQ detected by the torque sensor 42, the rotation angle θm detected by the resolver 44, and the like. The EPS ECU 45 may control the EPS system 40 in accordance with instructions from the control device 30.

The EPS system 40 (for example, EPS ECU 45) may output, to the control device 30, the information indicating the steering angle θst detected by the steering angle sensor 41, the steering torque TQ detected by the torque sensor 42, the rotation angle θm detected by the resolver 44, and the like. Furthermore, the EPS system 40 (for example, EPS ECU 45) may output information indicating a steering speed ω of the steering wheel 46 to the control device 30. In this case, the steering speed ω is obtained, for example, by time-differentiating the steering angle θst.

The driving force control system 50 includes a driving ECU 51, and can control a driving force of the vehicle 1. The driving ECU 51 is, for example, a computer that includes a processor for performing various calculations, a storage unit including a non-transitory storage medium for storing various kinds of information, an input and output unit for controlling input and output of data between the inside and outside of the driving ECU 51, and the like (all not shown), and controls the driving force control system 50, and is implemented by one or more ECUs. For example, the driving ECU 51 controls the driving force output from the drive source of the vehicle 1 based on an amount of operation of an accelerator pedal 52 provided at the vehicle 1 and a detection value of a shift position sensor 53 that detects a shift position Ps of a shift device (for example, a shift lever or a shift switch) (not shown). The drive source is an internal combustion engine or a motor as described above, and the driving ECU 51 controls output of the internal combustion engine or the motor based on the amount of operation of the accelerator pedal 52 and the shift position Ps. The driving ECU 51 can also control the driving force control system 50 (for example, the drive source) according to an instruction from the control device 30.

The braking force control system 60 includes a braking ECU 61 and can control a braking force of the vehicle 1. The braking ECU 61 is, for example, a computer that includes a processor for performing various calculations, a storage unit including a non-transitory storage medium for storing various kinds of information, an input and output unit for controlling input and output of data between the inside and outside of the braking ECU 61, and the like (all not shown), and controls the braking force control system 60, and is implemented by one or more ECUs. For example, the braking ECU 61 controls the braking force of the vehicle 1 by controlling a brake device (not shown) included in the vehicle 1 based on an operation on a brake pedal 62 provided on the vehicle 1. Here, the brake device includes, for example, a brake caliper, a cylinder that transmits a hydraulic pressure to the brake caliper, and an electric motor that generates the hydraulic pressure in the cylinder. The braking ECU 61 controls the electric motor of the brake device such that a braking force corresponding to the operation on the brake pedal 62 is generated. The braking ECU 61 can also control the braking force control system 60 according to an instruction from the control device 30.

The communication unit 70 is a communication interface that communicates with an external device 2 under an instruction of a control performed by the control device 30. That is, the control device 30 may communicate with the external device 2 via the communication unit 70. Examples of the external device 2 may include a terminal device (for example, a smartphone) of the driver and a server device managed by a manufacturer of the vehicle 1. For example, a mobile communication network such as a cellular line, Wi-Fi (registered trademark), bluetooth (registered trademark), or the like can be used for the communication between the vehicle 1 and the external device 2.

<Configuration of Control Device>

Next, a configuration of the control device 30 will be specifically described. As described above, the control device 30 includes a storage unit 35. The storage unit 35 stores various kinds of data and programs executed by the control device 30. For example, the storage unit 35 stores route data 35*a*.

The route data 35*a* is information indicating a route history when the vehicle 1 moves to the predetermined parking position, and the route data is accumulated as the vehicle 1 moves. The route data 35*a* may include information that can specify a route followed by the vehicle 1 when moving to the predetermined parking position (hereinafter, simply referred to as the "route"), and information on vegetation and obstacles present in the route. In particular, in the present embodiment, when the vehicle 1 moves to a parking position provided in a region (for example, private land) that is not included in the map information database 24, the control device 30 causes the vehicle 1 to move by referring to the route data 35*a*.

Figure 2:
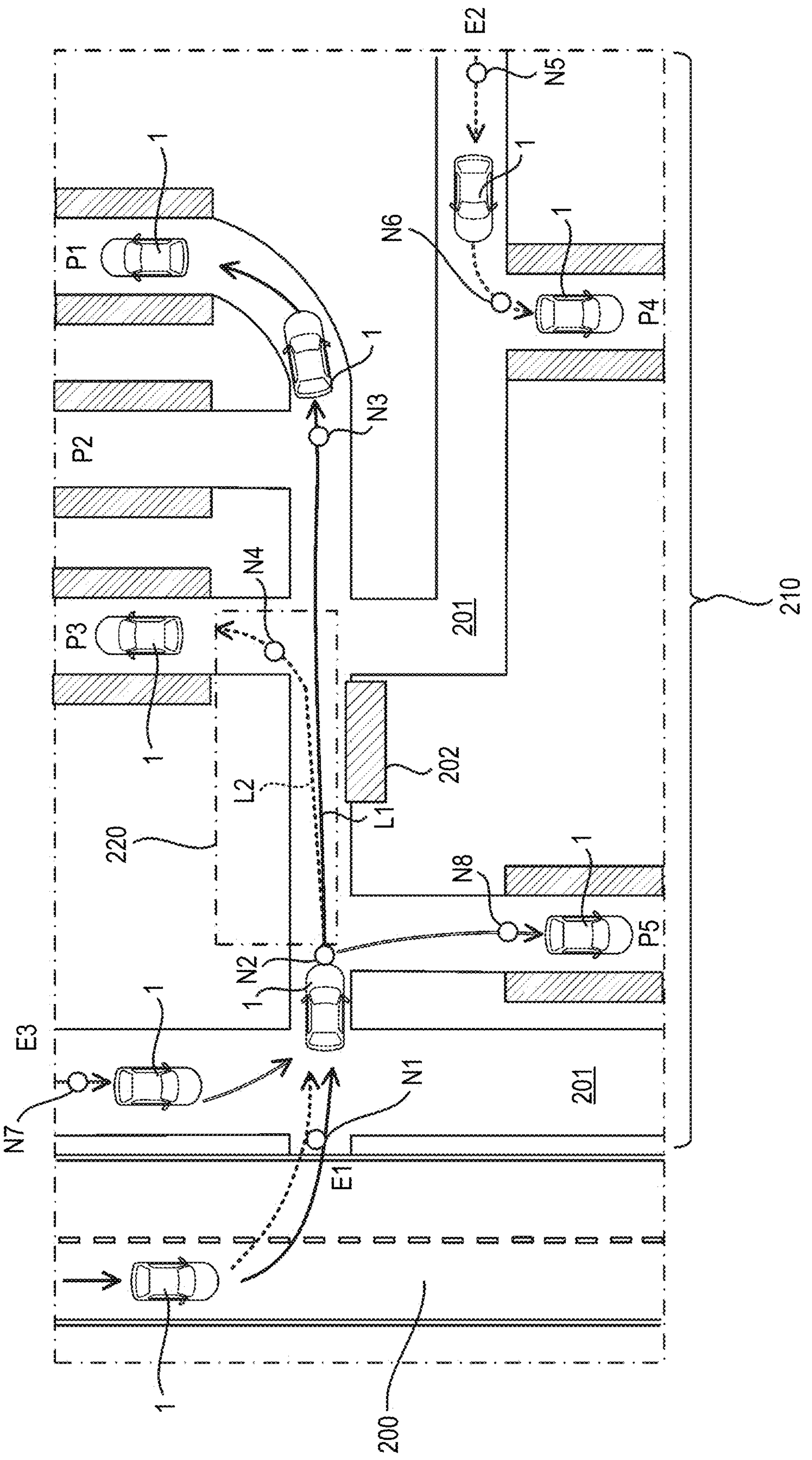
FIG. 2 is a diagram for illustrating routes to respective parking positions.

FIG. 2 is a diagram showing an example of a route for moving the vehicle 1 to each of parking positions (for example, parking positions P1 to P5). As shown by arrows in FIG. 2, the vehicle 1 may enter a private land 210 of a user (for example, a driver) from a general road 200 which is a public road (including a highway or the like), and move to the parking positions P1 to P5 in a garage or the like provided in the private land 210 as the target positions.

In the private land 210, a driveway 201 which is a road in the private land 210 (in other words, a private road), is provided. Symbols E1, E2, and E3 shown in FIG. 2 indicate entrances to the private land 210 from general roads such as the general road 200. The driveway 201 is provided to connect at least one of the entrances E1 to E3 to the parking positions P1 to P5. That is, the vehicle 1 can enter the private land 210 from at least one of the entrances E1 to E3, travel along the driveway 201, and park at the parking positions P1 to P5.

In FIG. 2, the routes to the parking positions P1, P3, P4, and P5 are indicated by various lines, such as solid lines and dashed lines. For example, the routes indicated by the solid line show routes to the parking position P1 from the entrance E1 which is one of the entrances from the general road 200 to the private land 210. An obstacle 202 on the driveway 201 is, for example, a permanent trash can, vegetation, and the like.

Such a parking history at each of the parking positions P1 to P5 provided within the private land 210, and information such as the route traveled by the vehicle 1 when parking at each of the parking positions P1 to P5 are recorded in the storage unit 35 as parking history information 35*b*.

Figures 3, 4:
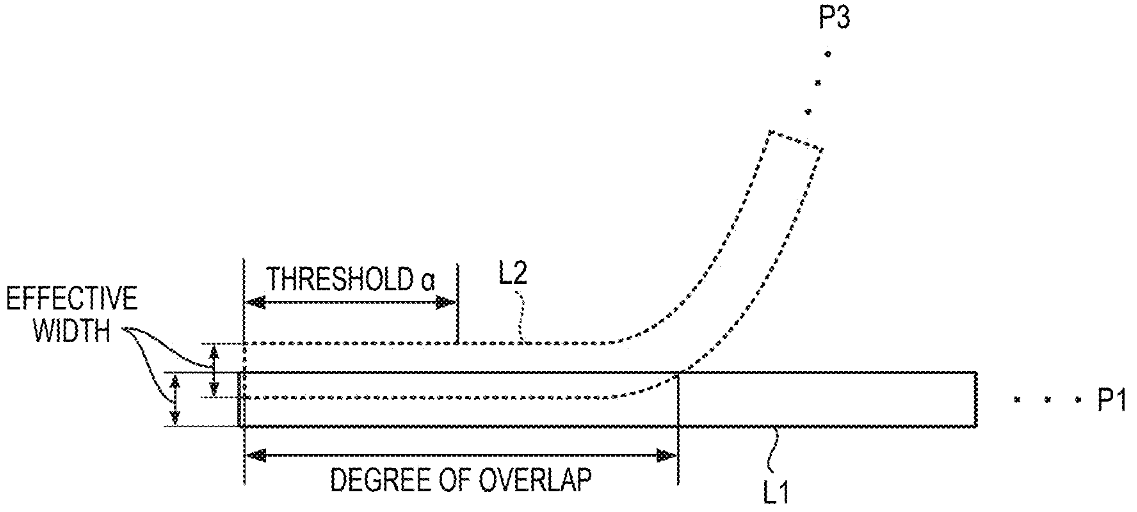
FIG. 3 is a diagram showing an example of parking history information 35*b;*
FIG. 4 is a diagram for illustrating a degree of overlap of routes.

FIG. 3 is a diagram showing an example of the parking history information 35*b*. The parking history information 35*b* includes information on a parking position, a route, the number of parking times, most recent use, and a priority. The route information included in the parking history information 35*b* can be, for example, the route data 35*a* described above.

The parking position represents, for example, information on parking positions provided within the private land 210 described above, and in the present embodiment, five parking positions P1 to P5 are provided. These parking positions P1 to P5 are provided at positions determined in advance by, for example, the user.

The route represents information indicating the route to each of the parking positions (that is, a route on the driveway 201) after entering the private land 210 from the general road 200, and is an example of the "route information" in the present disclosure. For example, the route traveled by the vehicle 1 is recorded for this route, and in an example shown in FIG. 3, parking histories of the vehicle 1 at the parking positions P1, P3, P4, and P5 among the parking positions are present, so that routes based on the parking histories are recorded. The parking history including the route corresponding to the parking position P2 is not recorded because there is no parking history of the vehicle 1 at the parking position P2. The route is defined by a sequence of nodes N (N1, N2, N3, . . . , and N8) that indicate coordinates of end points and branch points of the routes, for example. Since the node N is defined in the route data 35*a* within the private land 210, it is sufficient to simply specify which route is followed, and therefore the nature of the node N may be different from that of a node defined in the map information database 24. The route may be defined by a sequence of links or the like other than the node N. A plurality of pieces of route information may be recorded for one parking position. This is because, as described above, a plurality of entrances (entrances E1 to E3) from the general road 200 to the private land 210 are present.

The number of parking times indicates information on the number of times the vehicle 1 is parked at each of the parking positions P1 to P5. The number of parking times may be the predefined number of parking times, such as the cumulative number of parking times since each of the parking positions is established, or the number of parking times within a predetermined period (for example, one month).

The most recent use indicates information on whether each of the parking positions P1 to P5 is used recently. The most recent use described here may be defined, for example, as whether the parking position is used in the most recent three times, or whether the parking position is used within a predetermined period (for example, within the most recent week). The information on the most recent use and the information on the number of parking times are examples of the "usage" in the present disclosure.

The priority is information indicating the priorities of the parking positions P1 to P5, and is determined, for example, by the information on the number of parking times and the information on the most recent use. In the example shown in FIG. 3, the priority is determined based on the number of parking times, and for example, the parking position P1 has the highest priority.

The parking is recorded in the parking history information 35*b* each time the vehicle 1 parks at each of the parking positions P1 to P5 (or each time the vehicle 1 parks a predetermined number of times), and at the same time, the parking history information 35*b* is updated. That is, the route, the number of parking times, and the priority recorded in the parking history information 35*b* are updated at a predetermined cycle. The update processing is executed by, for example, a processing unit 32 described later.

The control device 30 executes various programs stored in the storage unit 35. In the present embodiment, the control device 30 executes processing of grouping a plurality of parking positions, for example, by referring to the parking history information 35*b*. In the processing, well-known in the related art, of grouping the plurality of parking positions, for example, processing of grouping adjacent parking positions is executed. In such a case, for example, a parking position not used by the user may also be grouped, and it is desirable to group the parking positions according to a usage of the user. Therefore, in the present embodiment, a possibility of implementing the grouping of the parking positions according to the usage of the user is increased.

Specifically, the control device 30 executes processing of grouping two or more of the parking positions P1 to P5 as an example of a program recorded in the storage unit 35. The control device 30 includes an acquisition unit 31, the processing unit 32, a control unit 33, and a display control unit 34 as functional units that are implemented by executing the program. In the following, the processing described as one performed by the acquisition unit 31, the image processing unit 32, the control unit 33, and the display control unit 34 is implemented by the control device 30.

The acquisition unit 31 acquires information on the parking history of each of the parking positions P1 to P5 by referring to the parking history information 35*b*. For example, the acquisition unit 31 acquires the information on the routes to the parking positions P1 to P5, the information on the number of parking times of each of the parking positions P1 to P5, the information on the most recent use, and the information on the priority of each of the parking positions P1 to P5.

The processing unit 32 groups two or more parking positions with the routes at least partially overlapping each other in the parking positions P1 to P5 based on the route information acquired by the function of the acquisition unit 31. For example, the processing unit 32 refers to the parking history information 35*b* to identify the route to each of the parking positions P1 to P5, and identifies two or more routes in which the routes at least partially overlap each other. Specifically, the processing unit 32 identifies the node N of the route included in the parking history information 35*b*, and identifies a parking position that is reached through the same node N. For example, in the route information included in the parking history information 35*b* in FIG. 3, parking positions having information on the same node N (that is, a common node N) include the parking position P1 and the parking position P3, which have the node N1 and the node N2, respectively. In addition, by focusing on the node N2, it can be seen that the route to the parking position P5 also has the node N2 as a route. The parking position P4 does not have the same node N as any other parking position as a route (parking position P2 is excluded from the target because the route thereto is not recorded). Therefore, in this point, the parking position P1, the parking position P3, and the parking position P5 can become candidates for the same group.

In grouping the parking positions, as described above, a condition is that the routes at least partially overlap each other. Here, "the routes at least partially overlap each other" means that a degree of overlap between the routes is equal to or greater than a predetermined threshold $\alpha$. FIG. 4 is an enlarged view of a portion surrounded by the dashed lines in FIG. 2. Here, for convenience, the route indicated by the solid line that reaches the parking position P1 is designated as L1, and the route indicated by the dashed line that reaches the parking position P3 is designated as L2. For example, the route L1 and the route L2 have the degree of overlap equal to or greater than the threshold $\alpha$. Therefore, the condition that the routes at least partially overlap each other is satisfied, and the processing unit 32 groups, into the same group, the parking position P1 and the parking position P3 that are reached through the routes. The route L1 and the route L2 shown in FIG. 4 have the same direction (that is, traveling direction) for the routes to the parking position P1 and the parking position P3, respectively, but the directions of the routes that at least partially overlap each other may be different (opposite directions or intersecting directions) as long as the degree of overlap between the routes is equal to or greater than a threshold.

The threshold $\alpha$ may be set appropriately by a manufacturer, a user, or the like of the vehicle 1, and is set to a value that excludes the grouping of the parking positions due to overlapping of routes due to simple intersections or the like of the routes. The value is set to, for example, several tens of meters or more.

The route traveled by the vehicle 1 may not necessarily be the same trace line. For example, as described with the example of FIG. 4, the route L1 and the route L2 are offset in an upper-lower direction in the paper. This is because the driveway 201 has a predetermined road width, and the vehicle 1 travels within the range of the road width. Therefore, in the present embodiment, an effective width is set in which the vehicle 1 is considered to be able to travel through the same route even if the trace lines are different in a width direction of the road. That is, the processing unit 32 identifies two or more routes that are within the range of the effective width in the width direction of the road and that at least partially overlap each other by the threshold $\alpha$ or more, and groups, into the same group, the parking positions that are reached through the identified routes.

By such a method, it is determined whether the routes at least partially overlap each other for the parking position P5, which is the remaining candidate for the grouping described above. As described with the example of FIG. 2, regarding the route to the parking position P5, the vehicle enters the private land 210 from the entrance E3, passes through the node N2, which is common to the routes to the parking position P2 and the parking position P3, and reaches the parking position P5. When the degree of overlap of the routes is determined by the same method as for the parking position P1 and the parking position P3, it is assumed that the degree of overlap of the route to the parking position P5 and the routes to the parking position P1 and the parking position P3 is equal to or greater than the threshold α. That is, the route to the parking position P5 intersects with the routes to the parking position P1 and the parking position P3, and it is assumed that the degree of overlap between the routes is equal to or greater than the threshold α. In such a case, the processing unit 32 groups the parking position P1, the parking position P3, and the parking position P5 into the same group.

The route information recorded in the parking history information 35*b* may include a plurality of recorded routes to reach the parking positions. As described above, since the plurality of entrances to the private land 210 are present, a plurality of routes to each of the parking positions P1 to P5 may be present. Therefore, a plurality of routes may be recorded, and in the case where the plurality of routes are recorded, the processing unit 32 groups the parking positions based on the route with highest degree of use among the plurality of recorded routes. The "degree of use" described here may be defined, for example, by the number of use times of the route with respect to the number of parking times or a frequency of the most recent use (for example, the frequency of use in the most recent three times). That is, the route with largest number of use times with respect to the number of parking times, or the route with the highest frequency of use in the most recent three times parking is the route for achieving the grouping of the parking positions.

The processing unit 32 updates the parking history information 35*b* described above according to the usage of the parking position. For example, in the state of the parking history information 35*b* shown in FIG. 3, when parking at the parking position P1 is performed, the number of parking times is updated from "10 times" to "11 times". Similarly, the route information, the information on the most recent use, and the information on the priority are also updated as appropriate. Examples of a case in which the route is updated include a case in which a detour is unavoidable due to growth of vegetation due to a change in season. In such a case, the route to the predetermined parking position of the vehicle 1 is changed, and the processing unit 32 updates the route information accordingly. In this way, the parking history information 35*b* is mainly updated by the function of the processing unit 32, but may also be updated by an operation of the user. For example, the user can update the route information or the like through an operation of a display unit such as the touch panel 22.

When the route is changed in this way, if the route to one parking position of the two or more grouped parking positions is updated, the processing unit 32 updates a part, overlapping the route to the one parking position before the update, of the route to another parking position among the two or more parking positions based on the route to the one parking position after the update. For example, as described with the above example, if the route to the parking position P1 among the grouped parking positions P1, P3, and P5 is updated, the part, overlapping the route to the parking position P1 before the update, of the route to another parking position, that is, the parking position P3 and the parking position P5 is updated based on the route to the parking position P1 after the update. That is, in the grouped parking positions described above, the overlapping parts of the routes (in other words, the common parts of the routes) are updated in accordance with the route to one grouped parking position, and the route to another parking position is also updated. In other words, in accordance with the update of the route to the one grouped parking position, the route to another parking position in the grouped parking positions is updated. This is because it is possible to reduce a processing load of the processing unit 32 (that is, the control device 30) compared to a case where the same part of the route is updated for each of the parking positions.

The processing unit 32 refers to the parking history information 35*b* to determine the priority of the parking positions of the vehicle 1 among the grouped parking positions based on the number of use times of each of the parking positions P1 to P5 and the usage obtained by the most recent use. The priority may be determined based on, for example, the information on the number of parking times or the information on the most recent use. Alternatively, the priority may be determined by comprehensively determining the information on the number of parking times and the information on the most recent use. The priority is preferably determined among the grouped parking positions described above, but when parking the vehicle 1 based on the priority by using the function of the control unit 33 described later, all of the grouped parking positions may be used by other users. In such a case, for example, the priority may be assigned to enable the vehicle 1 to be parked at a parking position that has a parking history among ungrouped parking positions. In the parking history information 35*b* shown in FIG. 3, the parking position P4 does not belong to the group of the parking positions P1, P3, and P5 described above, but is assigned a priority because the parking position P4 has the parking history.

The control unit 33 causes the vehicle 1 to autonomously move to the predetermined parking position based on the priorities of the parking positions determined by the function of the processing unit 32. Specifically, the control unit 33 performs a drive control, a braking control, and a steering control of the vehicle 1 via the driving ECU 51, the braking ECU 61, and the EPS ECU 45 to perform an autonomous driving control and an automatic parking control with the predetermined parking position based on the priority as the target parking position.

When moving the vehicle 1 based on the priority, the parking position with highest priority may be used by another user. In such a case, the control unit 33 identifies the parking position with next highest priority based on the determined priority, and causes the vehicle 1 to move to the identified parking position with next highest priority as the target parking position.

The display control unit 34 causes the display unit such as the touch panel 22 to display the information on the parking position. For example, the display control unit 34 causes the touch panel 22 to display the information on the parking positions based on the priorities of the parking positions. Specifically, the display control unit 34 causes the touch panel 22 to display the information on the target parking position to which the vehicle 1 is to move (or is moving) by the autonomous driving. The user who sees the display can know the information on which parking position the vehicle 1 is currently to move to or is moving to. For example, when the user sees the display and wants to park the vehicle 1 at a parking position different from the target parking position, the user can change the parking position to be moved to by operating the touch panel 22.

<Processing Executed by Control Device>

Figure 5:
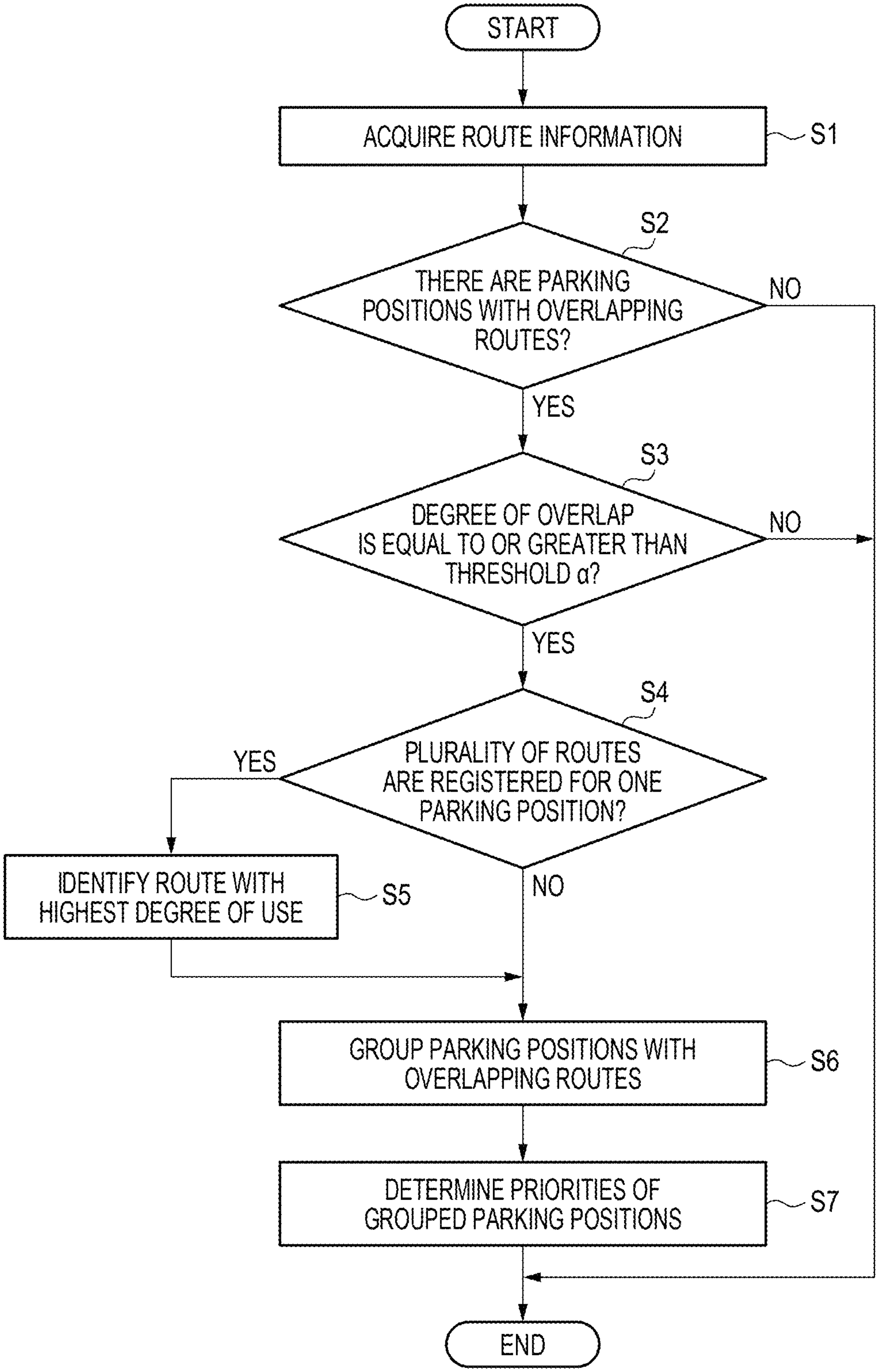
FIG. 5 is a flowchart (part 1) showing an example of processing executed by the control device 30 of the embodiment.

Next, an example of parking position grouping processing, executed by the control device 30, of grouping two or more parking positions will be described using a flowchart. FIG. 5 is a flowchart showing an example of the processing, and the processing is executed, for example, when the information of the parking history information 35*b* described above is updated.

The control device 30 first acquires the route information (step S1). That is, the control device 30 acquires the route information by referring to the parking history information 35*b* by the function of the acquisition unit 31.

Next, the control device 30 determines whether there are parking positions with overlapping routes (step S2). That is, the control device 30 identifies two or more parking positions with the routes at least partially overlapping each other by referring to the route information acquired in step S1 by the function of the processing unit 32. If it is determined that there are no parking positions with overlapping routes (No in step S2), the control device 30 temporarily ends the processing of the flowchart shown in FIG. 5.

On the contrary, if it is determined that there are parking positions with overlapping routes (Yes in step S2), the control device 30 determines whether the degree of overlap of the routes to the identified parking positions is equal to or greater than the threshold α by the function of the processing unit 32 (step S3). If it is determined that the degree of overlap of the routes is not equal to or greater than the threshold α (in other words, less than the threshold α) (No in step S3), the control device 30 temporarily ends the processing of the flowchart shown in FIG. 5.

On the other hand, if it is determined that the degree of overlap of the routes to the parking positions is equal to or greater than the threshold α (Yes in step S3), the control device 30 determines whether a plurality of routes are registered for one parking position whose degree of overlap of the routes is equal to or greater than the threshold α (step S4). There may be a case where a plurality of routes are registered for one parking position whose degree of overlap of the routes is determined to be equal to or greater than the threshold α. In such a case, when grouping the parking positions in step S6 described later, it may be unclear that the grouping is performed based on overlapping of which route to the one parking position with the route to another parking position. Therefore, in step S4, the control device 30 determines whether a plurality of routes are registered for one parking position by referring to the route information in the parking history information 35*b* to. If it is determined that the plurality of routes are registered (Yes in step S4), the control device 30 proceeds the processing to step S5. If it is determined that the plurality of routes are not registered (No in step S4), the control device 30 proceeds the processing to step S6 described later.

In step S5, the control device 30 identifies the route with highest degree of use among the plurality of routes registered for the one parking position. That is, the control device 30 refers to the route information in the parking history information 35*b* and identifies the route with highest degree of use due to the number of times of use being large among the plurality of routes registered for the one parking position, for example. After identifying the route with highest degree of use, the control device 30 proceeds the processing to step S6.

In step S6, the control device 30 groups the parking positions with overlapping routes by the function of the processing unit 32. Specifically, if it is determined in the above step S4 that the plurality of routes are registered for the one parking position, the parking positions are grouped based on the overlapping of the route with highest degree of use identified in step S5 in the one parking position with the route to another parking position. On the other hand, if it is determined in the above step S4 that the plurality of routes are not registered for the one parking position, since there is only one route connected to each of the parking positions with overlapping routes, the parking positions are grouped based on the overlapping routes.

Next, the control device 30 determines the priorities of the grouped parking positions (step S7). That is, the control device 30 determines the priorities for parking the vehicle 1 among the parking positions grouped in step S6 by the function of the processing unit 32. As described above, the priorities are determined based on the usage of the parking positions, such as information on the number of parking times of the grouped parking positions and information on the most recent use. Then, the control device 30 records the information on the determined priorities in the parking history information 35*b*.

Figure 6:
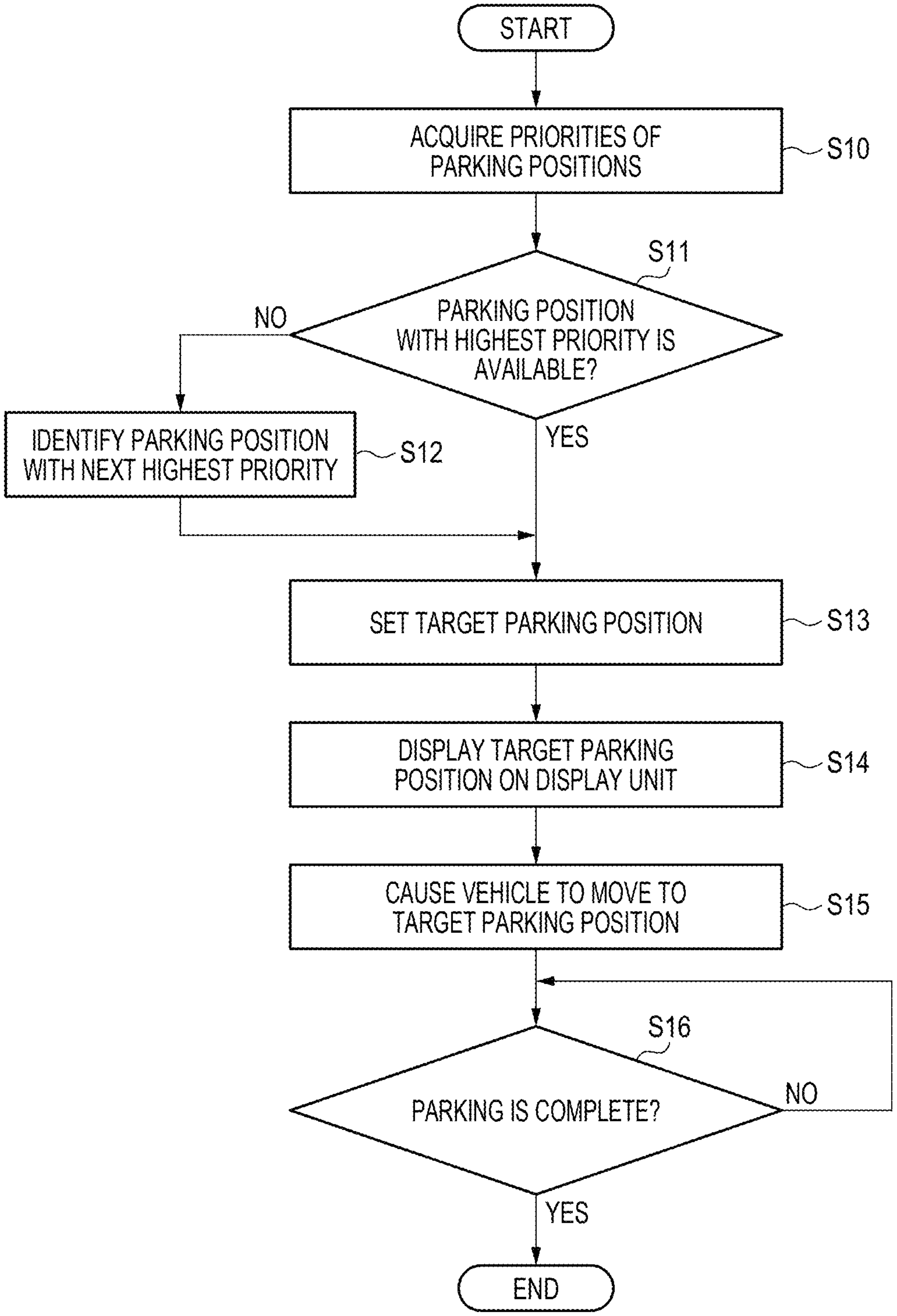
FIG. 6 is a flowchart (part 2) showing an example of the processing executed by the control device 30 of the embodiment.

Next, an example of vehicle movement processing in which the vehicle 1 is moved to the predetermined parking position based on the priorities of the parking positions determined in the processing of FIG. 5 will be described. FIG. 6 is a flowchart showing an example of the processing, and the processing is executed, for example, when the automatic parking function is turned on or when the vehicle enters the private land 210 from the entrance (entrances E1 to E3) described in FIG. 2 during the autonomous driving.

The control device 30 first acquires the information on the priorities of the parking positions (step S10). That is, the control device 30 refers to the parking history information 35*b* and acquires the information on the priorities of the parking positions.

Next, the control device 30 determines whether the parking position with highest priority is available (step S11). Specifically, for example, the control device 30 identifies an available status of the parking position with highest priority (for example, parking position P1) by detection by the camera 111 or the like. Alternatively, a sensor (not shown) capable of detecting whether a vehicle is parked may be provided in advance at each parking position, and information based on the sensor may be periodically output to the control device 30 to determine whether the parking position with highest priority is available. If it is determined that the parking position with highest priority is unavailable (No in step S11), the control device 30 proceeds the processing to step S12. If it is determined that the parking position with highest priority is available (Yes in step S11), the control device 30 proceeds the processing to step S13.

In step S12, the control device 30 identifies the parking position with next highest priority. That is, since the parking position with highest priority is unavailable, the control device 30 refers to the parking history information 35*b* to identify the parking position with next highest priority. After identifying the parking position, the control device 30 proceeds the processing to step S13. If the parking position with next highest priority identified in step S12 is unavailable, the parking position with third highest priority is identified, and the same processing as step S11 and step S12 is repeated until an available parking position can be identified.

In step S13, the control device 30 sets a target parking position. That is, when the control device 30 determines in step S11 that the parking position with highest priority is available, the control device 30 sets the parking position with highest priority as the target parking position. On the other hand, if the parking position with highest priority is determined to be unavailable and the parking position with next highest priority is identified in step S12, the control device 30 sets the parking position with next highest priority as the target parking position.

Next, the control device 30 causes the display unit such as the touch panel 22 to display the target parking position set in step S13 by the function of the display control unit 34 (step S14). This is to notify the user of the vehicle 1 of the parking position. The notification may be performed via the speaker 23 of the navigation device 20, in addition to the display on the touch panel 22. If the user, who knows the parking position through the display on the touch panel 22 or the like, wants to park at a parking position different from the displayed parking position, the user can change the parking position by an operation on the touch panel 22.

Next, the control device 30 causes the vehicle 1 to move to the target parking position (step S15). That is, the control device 30 causes the vehicle 1 to move to the target parking position set in step S13 by the function of the control unit 33. Specifically, the control device 30 performs the drive control, the braking control, and the steering control of the vehicle 1 via the driving ECU 51, the braking ECU 61, and the EPS ECU 45, causes the vehicle 1 to move to the target parking position, and performs the parking.

Next, the control device 30 determines whether the parking at the target parking position is complete (step S16). For example, the control device 30 identifies the position and the attitude of the vehicle 1 based on the detection of the camera 111 or the like, and determines that the parking of the vehicle 1 at the target parking position is complete when the vehicle 1 is accommodated in a parking frame of the target parking position and the attitude of the vehicle 1 is parallel to a line indicating the parking frame. Alternatively, if it is determined that the shift position Ps of the shift device is in parking (P), it is determined that the parking is complete. The shift position Ps is determined based on a signal input from the shift position sensor 53 to the control device 30, for example. In step S16, if it is determined that the parking at the target parking position is not complete (No in step S16), the control device 30 waits until the parking is complete.

On the contrary, if it is determined that the parking at the target parking position is complete (Yes in step S16), the control device 30 ends the vehicle movement processing in FIG. 6.

Figure 7:
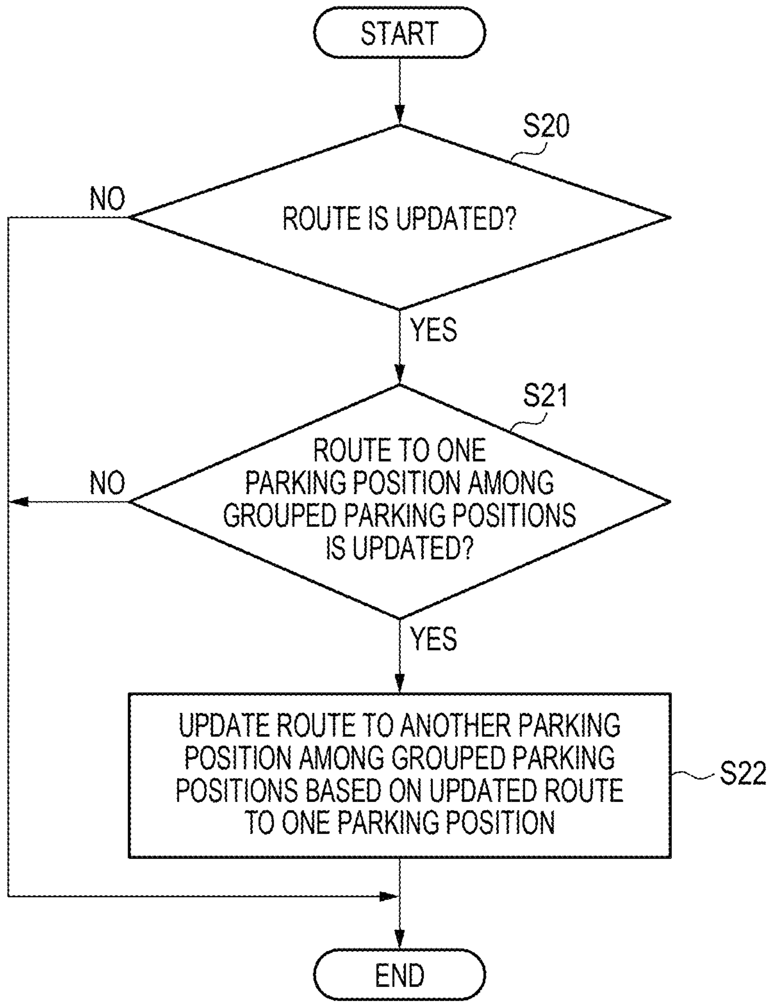
FIG. 7 is a flowchart (part 3) showing an example of the processing executed by the control device 30 of the embodiment.

Next, route update processing of updating the route to another grouped parking position in accordance with the update of the route to the one grouped parking position will be described. FIG. 7 is a flowchart showing an example of the processing, and the processing is executed, for example, at a predetermined cycle (for example, once a month, or at a cycle when a route may change).

As described above, the route to the parking position may be changed (that is, updated), for example, due to the growth of vegetation due to the season. Therefore, the control device 30 first determines whether the route is updated (step S20). That is, the control device 30 determines whether there is updated route information by referring to the parking history information 35*b* to. If it is determined that there is no updated route information (No in step S20), the control device 30 temporarily ends the processing of the flowchart shown in FIG. 7.

On the contrary, if it is determined that there is updated route information (Yes in step S20), the control device 30 determines whether the update of the route is an update of the route to one parking position among the grouped parking positions (step S21). If it is determined that the update of the route is not an update of the route to one parking position among the grouped parking positions (No in step S21), the control device 30 temporarily ends the processing of the flowchart shown in FIG. 7.

On the other hand, if it is determined that the updated route is the route to one parking position among the grouped parking positions (Yes in step S21), the control device 30 updates the route to another parking position among the grouped parking positions based on the updated route to the one parking position (step S22). That is, the control device 30 updates the route to another parking position in the grouped parking positions in accordance with the update of the route to the one grouped parking position by the function of the processing unit 32. That is, the control device 30 collectively updates the information on the overlapping parts of the routes in the grouped parking positions. Then, by performing the update, the route information of the parking history information 35*b* is updated.

As described above, in the present embodiment, when grouping a plurality of parking positions, the grouping is performed based on the route information. That is, two or more parking positions in which the routes to the parking positions at least partially overlap each other are grouped. By performing the grouping of the parking positions based on the routes in this way, for example, adjacent parking positions are not grouped if the routes thereto do not overlap each other, and on the contrary, two or more parking positions that are seemingly separated are grouped into the same group if the routes thereto overlap each other. That is, it is possible to group the parking positions according to the usage of the user, and as a result, for example, unnecessary parking positions that are not used by the user can be avoided from being grouped.

By grouping the parking positions according to the usage of the user, the vehicle 1 is parked based on the grouped parking positions, and thus it is possible to avoid the vehicle 1 from being parked at, for example, a parking position that is not used by the user. By executing such processing, the control device 30 can improve safety of traffic and contribute to development of a sustainable transportation system.

In the present embodiment, the control device 30 groups two or more parking positions with the routes having a degree of overlap equal to or greater than the threshold $\alpha$ in the grouping of the parking positions described above. The parking positions grouped into the same group are likely to share a common route to a certain extent. Accordingly, it is possible to exclude the grouping of the parking positions with the routes having the degree of overlap less than the threshold $\alpha$, such as a simple intersection of a part of the routes, and as a result, it is possible to further increase the possibility that the parking positions used by the user are grouped.

In the present embodiment, when a plurality of routes to reach the parking position are recorded in the route information in the parking history information 35*b*, the control device 30 performs the above grouping based on the route having highest degree of use among the plurality of recorded routes. Accordingly, for example, the grouping based on the route with lowest degree of use is not performed for the parking positions with the plurality of routes recorded, and as a result, the parking positions connected to the routes according to the degree of use of the user are grouped.

In the present embodiment, the control device 30 determines the priorities for parking the vehicle among the grouped parking positions based on the usage. Accordingly, the vehicle 1 is parked based on the priorities among the grouped parking positions, and thus it is possible to park the vehicle based on the usage of the user. By determining the priority in this way, if the parking position with highest priority is unavailable, the parking position with next highest priority becomes a parking candidate, and the vehicle 1 can be autonomously parked at the parking position. Since the priority is based on the usage of the user, if the parking position with highest priority is unavailable, the user is unlikely to feel uncomfortable even if the vehicle 1 is autonomously parked at the parking position with next highest priority. Furthermore, even if the user does not perform the specification, the vehicle 1 is parked at a parking position according to the usage of the user, so that the user can save an effort of specifying the parking position by himself/herself.

In the present embodiment, when the route to one parking position among the two or more grouped parking positions is updated, the part, overlapping the route to one parking position before the update, of the route to another parking position among the two or more parking positions is updated based on the route to one parking position after the update. That is, when the route to one parking position among the grouped parking positions is updated, the common part of the route to another grouped parking position is updated in the same way. Accordingly, it is possible to reduce a processing load of the control device 30 compared to a case where the common part of the route is updated for each parking position.

In the present embodiment, the information on the parking positions based on the above priority is displayed on the display unit such as the touch panel 22. Accordingly, the user can easily know the information on which parking position the vehicle 1 is to move to or is moving to. The user can specify the parking position through the operation on the touch panel 22, and thus, for example, when the user wants to change the parking position with respect to the display of the parking position based on the priority, the user can change the parking position by his/her own operation.

The route information in the parking history information 35*b* can be updated by the processing of the control device 30 and the operation on the touch panel 22 or the like by the user himself/herself. Accordingly, for example, if the route is suddenly changed, the changed route can be immediately reflected by the update performed by the user.

<Another Embodiment>

Next, another embodiment will be described. The grouping of the parking positions described in the above embodiment is not limited to one group, and grouping to generate a plurality of groups may be performed. For example, when there are four or more parking positions, the control device 30 may generate two groups based on the two or more parking positions with the routes at least partially overlapping each other. Furthermore, depending on the number of provided parking positions, the number of groups may be three or more. When the grouping into a plurality of groups is performed in this way, the control device 30 may select a group of parking positions for the vehicle 1 to be parked according to a time period (for example, morning or night) or a situation (for example, driving to or from a cram school or shopping at a supermarket) based on the parking history of the vehicle 1 of the user, and causes the vehicle 1 to move to the predetermined parking position. For example, when two groups are generated by the parking position grouping processing described above, one group is a group generated based on parking positions used in a time period such as the morning. The other group is a group generated based on parking positions used in a time period such as the evening to night. In this case, the control device 30 may, for example, acquire a current time, and cause the vehicle 1 to move to a parking position based on the priority in one group based on the acquired current time. By executing such processing, it is possible to perform the grouping to generate a plurality of groups according to the usage of the user, and it becomes possible to park the vehicle 1 according to a usage scene of the user.

In addition to using different groups according to the usage scene of the user in this way, when the parking positions are grouped into a plurality of groups, the priority may be determined on a group basis, rather than for each parking position.

<Others>

Although an embodiment of the present disclosure has been described above with reference to the drawings, it goes without saying that the present disclosure is not limited to the embodiment described above. It is apparent that those skilled in the art may conceive of various modifications and changes within the scope described in the claims, and it is understood that such modifications and changes naturally fall within the technical scope of the present disclosure.

For example, in the above embodiment, the parking position is provided within the private land 210, but the parking position may be provided outside the private land for which the route information or the like is present in the map information database 24. In such a case, the control device 30 refers to the map information database 24, identifies the parking positions with the routes partially overlapping each other, and executes the grouping processing described above.

The control method described in the above embodiment may be implemented by executing a control program prepared in advance on a computer. The control program is stored in a computer-readable storage medium and executed by being read from the storage medium. In addition, the control program may be provided in a form stored in a non-transitory storage medium such as a flash memory, or may be provided via a network such as the Internet. The computer that executes the present control program may be provided in the control device, may be provided in an electronic device such as a smartphone, a tablet terminal, or a personal computer that can communicate with the control device, or may be provided in a server device that can communicate with the control device and the electronic device.

In the present specification, at least the following matters are described. Although corresponding constituent elements in the embodiment described above are shown in parentheses, the present disclosure is not limited thereto.

(1) A control device for controlling a vehicle (vehicle 10) to be parked at a predetermined parking position (parking positions P1 to P5), the control device including:

- an acquisition unit (acquisition unit 31) configured to acquire route information capable of identifying a route to each of parking positions;
- a processing unit (processing unit 32) configured to group two or more parking positions with routes at least partially overlapping each other based on the route information; and
- a control unit (control unit 33) configured to cause the vehicle to move toward the grouped two or more parking positions.

According to (1), for example, adjacent parking positions are not grouped if the routes thereto do not overlap each other, and on the contrary, two or more parking positions that are seemingly separated are grouped into the same group if the routes thereto overlap each other. That is, it is possible to group the parking positions according to the usage of the user, and as a result, for example, unnecessary parking positions that are not used by the user can be avoided from being grouped. The vehicle can move to the parking position grouped in this way.

(2) The control device according to (1), in which the processing unit groups the two or more parking positions with the routes having a degree of overlap equal to or greater than a threshold (threshold $\alpha$).

According to (2), it is possible to exclude the grouping of the parking positions with the routes having the degree of overlap less than the threshold, such as a simple intersection of a part of the routes, and as a result, it is possible to further increase a possibility that the parking positions used by the user are grouped.

(3) The control device according to (1), in which when a route to one parking position of the two or more grouped parking positions is updated, the processing unit updates a part, overlapping the route to the one parking position before the update, of a route to another parking position of the two or more parking positions based on the updated route to the one parking position.

According to (3), for example, it is possible to reduce a processing load of the control device compared to a case where the common part of the route is updated for each parking position.

(4) The control device according to (1), in which in a case where a plurality of routes to reach the parking position are recorded in the route information, the processing unit performs the grouping based on a route with highest degree of use among the plurality of recorded routes.

According to (4), for example, the grouping based on the route with lowest degree of use is not performed for the parking positions with the plurality of routes recorded, and as a result, the parking positions connected to the routes according to the degree of use of the user are grouped.

(5) The control device according to (1), in which the acquisition unit further acquires a usage including the number of parking times of each of the parking positions, and the processing unit determines a priority for parking the vehicle among the grouped two or more parking positions based on the usage.

According to (5), the vehicle is parked based on the priority among the grouped parking positions, and thus it is possible to park the vehicle based on the usage of the user.

(6) The control device according to (5), further including:

a display control unit (display control unit 34) configured to cause a predetermined display unit (touch panel 22) to display information on the parking position, in which the display control unit causes the display unit to display the information on the parking position based on the priority.

According to (6), the user can easily know the information on which parking position the vehicle is to move to or is moving to.

(7) The control device according to (6), in which the display unit is configured to receive an operation of a user, and the route information is allowed to be updated via an operation on the display unit.

According to (7), for example, if the route is suddenly changed, the changed route can be immediately reflected as the route information by the update performed by the user.

(8) A control method using a computer for controlling a vehicle (vehicle 10) to be parked at a predetermined parking position (parking positions P1 to P5), the control method including:

acquiring route information capable of identifying a route to each of parking positions;

grouping two or more parking positions with routes at least partially overlapping each other based on the route information; and causing the vehicle to move toward the grouped two or more parking positions.

According to (8), for example, adjacent parking positions are not grouped if the routes thereto do not overlap each other, and on the contrary, two or more parking positions that are seemingly separated are grouped into the same group if the routes thereto overlap each other. That is, it is possible to group the parking positions according to the usage of the user, and as a result, for example, unnecessary parking positions that are not used by the user can be avoided from being grouped. The vehicle can move to the parking position grouped in this way.

(9) A non-transitory computer-readable storage medium storing a control program causing a computer for controlling a vehicle (vehicle 10) to be parked at a predetermined parking position (parking positions P1 to P5) to execute a process, the process including:

acquiring route information capable of identifying a route to each of parking positions;

grouping two or more parking positions with routes at least partially overlapping each other based on the route information; and causing the vehicle to move toward the grouped two or more parking positions.

According to (9), for example, adjacent parking positions are not grouped if the routes thereto do not overlap each other, and on the contrary, two or more parking positions that are seemingly separated are grouped into the same group if the routes thereto overlap each other. That is, it is possible to group the parking positions according to the usage of the user, and as a result, for example, unnecessary parking positions that are not used by the user can be avoided from being grouped. The vehicle can move to the parking position grouped in this way.

What is claimed is:

1. A control device for controlling a vehicle to be parked at a predetermined parking position, the control device comprising:

a storage that stores route information capable of identifying a route when the vehicle was parked to each parking position in the past; and processing circuitry configured to, in a case where a plurality of routes to reach the parking position are recorded, select one route from among the plurality of routes as a route to the predetermined parking position based on a degree of use by the vehicle, group two or more parking positions with routes at least partially overlapping each other based on the route information of the selected route; and cause the vehicle to move toward the grouped two or more parking positions.

2. The control device according to claim 1, wherein the processing circuitry groups the two or more parking positions with the routes having a degree of overlap equal to or greater than a threshold.

3. The control device according to claim 1, wherein when a route to one parking position of the two or more grouped parking positions is updated, the processing circuitry updates a part, overlapping the route to the one parking position before the update, of a route to another parking position of the two or more parking positions based on the updated route to the one parking position.

4. The control device according to claim 1, wherein in the case where a plurality of routes to reach the parking position are recorded in the route information, the processing circuitry performs the grouping based on a route with highest degree of use among the plurality of recorded routes.

5. The control device according to claim 1, wherein storage further stores usage information including the number of parking times of each of the parking positions, and the processing circuitry determines a priority for parking the vehicle among the grouped two or more parking positions based on the usage.

6. The control device according to claim 5, wherein the processing circuitry is further configured to: cause a display to display information on the parking position based on the priority.

7. The control device according to claim 6, further comprising: a display configured to receive an operation of a user, wherein the route information is allowed to be updated via an operation on the display.

8. The control device according to claim 1, wherein the processing circuitry generates a plurality of the groups, and the processing circuitry selects, from among the plurality of groups, the group used for controlling the vehicle according to at least a situation or a time period in which the vehicle is parked.

9. A control method using a computer for controlling a vehicle to be parked at a predetermined parking position, the control method comprising:

storing route information capable of identifying a route when the vehicle was parked to each parking position in the past;

selecting, in a case where a plurality of routes to reach the parking position are recorded, one route from among the plurality of routes as a route to the predetermined parking position based on a degree of use by the vehicle, grouping two or more parking positions with routes at least partially overlapping each other based on the route information of the selected route; and causing the vehicle to move toward the grouped two or more parking positions.

10. A control device for controlling a vehicle to be parked at a predetermined parking position, the control device comprising:

a storage that stores route information capable of identifying a route when the vehicle was parked to each parking position in the past; and processing circuitry configured to group two or more parking positions with routes at least partially overlapping each other based on the route information, and cause the vehicle to move toward the grouped two or more parking positions, wherein, when the route information of one parking position among the grouped two or more parking positions is updated, the processing circuitry identifies an overlapping part at which a route of the route information to the one parking position and a route of the route information to another parking position of the two or more parking positions overlap each other, and in response to the route information of the one parking position being updated, the processing circuitry updates a part of the route information to the another parking position corresponding to the overlapping part.

11. The control device according to claim 10, wherein the processing circuitry groups the two or more parking positions with the routes having a degree of overlap equal to or greater than a threshold.

12. The control device according to claim 10, wherein in the case where a plurality of routes to reach the parking position are recorded in the route information, the processing circuitry performs the grouping based on a route with highest degree of use among the plurality of recorded routes.

13. The control device according to claim 10, wherein the storage further stores usage information including the number of parking times of each of the parking positions, and the processing circuitry determines a priority for parking the vehicle among the grouped two or more parking positions based on the usage.

14. The control device according to claim 13, wherein the processing circuitry is further configured to cause a display to display information on the parking position based on the priority.

15. The control device according to claim 14, further comprising: a display configured to receive an operation of a user, wherein the route information is allowed to be updated via an operation on the display.

16. The control device according to claim 10, wherein the processing circuitry generates a plurality of the groups, and the processing circuitry selects, from among the plurality of groups, the group used for controlling the vehicle according to at least a situation or a time period in which the vehicle is parked.

* * * * *